Patented Nov. 17, 1953

2,659,736

UNITED STATES PATENT OFFICE 2,659,736

ACID DYESTUFFS OF THE ANTHRAQUINONE SERIES

Samuel von Allmen and Hans Eggenberger, Basel, Switzerland

No Drawing. Application September 24, 1951, Serial No. 248,108

Claims priority, application Switzerland September 27, 1950

6 Claims. (Cl. 260—372)

This invention relates to acid dyestuffs of the anthraquinone series.

A primary object of the present invention is the embodiment of acid dyestuffs of the anthraquinone series which are characterized by valuable properties such as excellent fastness properties, especially fastness to fulling and to perspiration, as well as excellent neutral drawing capacity.

This object, as well as others which will hereinafter become evident, is realized according to the present invention by the group of dyestuffs which correspond to the formula

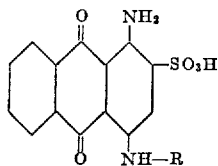

wherein R represents one of the following moieties

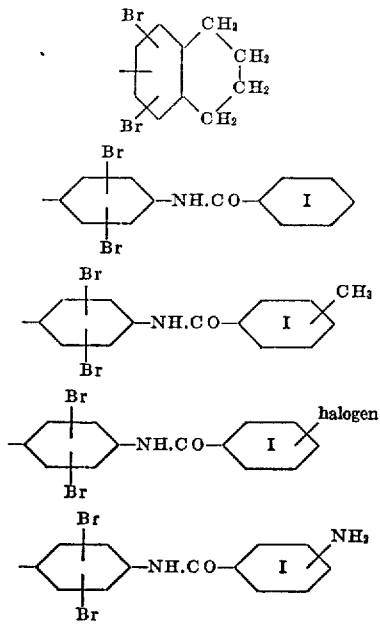

and

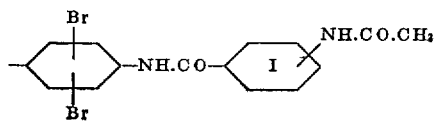

wherein nucleus I may bear a further substituent.

These dyestuffs of the present invention may be prepared by treating the appropriate aminoanthraquinone sulfonic acid corresponding to the formula

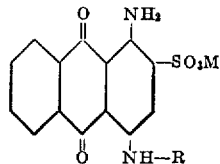

wherein M stands for hydrogen, $NH_4$, Li, Na or K, and R stands for

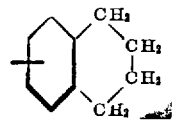

or

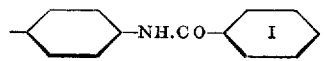

and wherein nucleus I may contain substituents such as methyl, halogen, $NH_2$ or $NH.CO.CH_3$, with a brominating agent.

The bromination is preferably carried out in sulfuric acid medium at a temperature within the range from 0 to 60° C. Suitable brominating agents are for example elementary bromine or sulfuryl bromide.

The working-up of the brominated dyestuff may be effected either by the addition of a small amount of water to the sulfuric acid solution thereof or by pouring the reaction mass into a mixture of ice and water. In the former event, the acid sulfate of the dyestuff precipitates, and this can be isolated in conventional manner; in the latter event, the free acid dyestuff is obtained directly and can be purified, for example by reprecipitation.

The dyestuffs of the invention dissolve in water with a reddish blue coloration. The color of the solutions thereof in concentrated sulfuric acid ranges from blue to reddish blue; upon addition of paraformaldehyde, the color changes toward greenish blue to green. The said dyestuffs dye wool and other animal fibers, as well as nitrogen-containing synthetic fibers such as nylon, in intense pure reddish blue shades of outstanding fastness to fulling and excellent fastness to perspiration. The dyestuffs are also distinguished by a remarkably good neutral drawing capacity.

Especially noteworthy is the fact that the starting dyestuffs wherein, for example, R stands for the

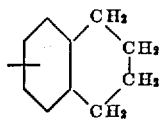

moiety, are practically quantitatively converted, upon treatment with elementary bromine, into the beautiful reddish blue bromine derivatives which are fast to fulling, while, upon treatment with chlorine, useless products—probably with a carbazole structure—are forthwith produced.

The following examples set forth representative exemplary embodiments of the invention, and these examples are intended to be solely illustrative and not at all limitative. In these examples, the parts and percentages are by weight, and the temperatures are expressed in degrees centigrade.

Example 1

47.0 parts of the dyestuff of the formula

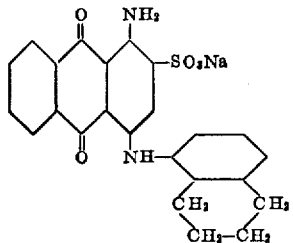

are dissolved in 1500 parts of sulfuric acid of 90% strength, and then 26 parts of bromine are added. The mass is stirred for 6 hours at room temperature (about 20 to 30°) and then for 3 more hours at 60°.

After working up the dyestuff in either of the ways precedingly described, there is obtained a dyestuff which dissolves in water with reddish blue coloration. The color of its solution in concentrated sulfuric acid is clear blue which, upon addition of paraformaldehyde, changes toward greenish blue. The dyestuff, which corresponds to the following composition:

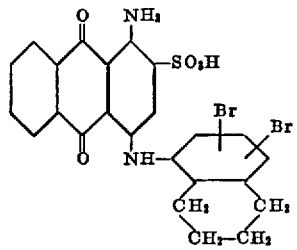

dyes wool and other animal fibers, as well as nylon, in clear reddish blue shades of outstanding fastness to perspiration and to fulling, and also has an excellent neutral drawing capacity.

Example 2

44.8 parts of the dyestuff of the formula

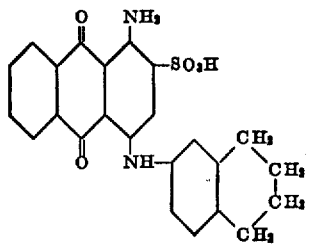

are dissolved in 1000 parts of sulfuric acid of 87% strength. 30 parts of bromine are then added dropwise to the resultant solution over a period of 3 hours. The mass is stirred for 72 hours at room temperature (about 20 to 30°) and is then worked up as precedingly described. There is thus obtained a dyestuff which corresponds to the following composition:

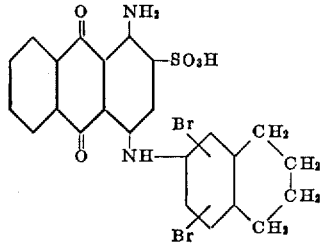

and which has properties similar to those of the dyestuff obtained in Example 1.

The identical dyestuff of the present example is obtained when, as brominating agent, the bromine is replaced by an equivalent amount of sulfuryl bromide, while otherwise proceeding as described.

Example 3

53.5 parts of the dyestuff of the formula

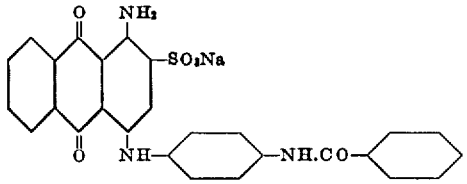

are dissolved in 1200 parts of sulfuric acid of 96% strength, and 24 parts of bromine then added. The reaction mixture is stirred for 48 hours at room temperature (about 20 to 30°), whereupon the dyestuff is worked up as precedingly described. The thus-obtained dyestuff, which corresponds to the following composition:

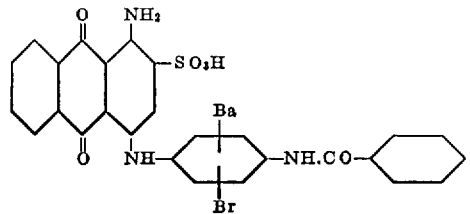

is a reddish blue powder which dissolves in water with a reddish blue coloration. Its solution in concentrated sulfuric acid is colored reddish blue which, upon the addition of paraformaldehyde, turns toward green. It dyes wool and other animal fibers, as well as nylon, in clear reddish blue shades of outstanding fastness to fulling and of good fastness to light; it is also characterized by excellent neutral drawing capacity.

Example 4

55.0 parts of the dyestuff of the formula

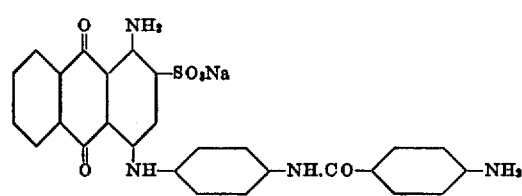

are dissolved in 1000 parts of sulfuric acid of 92% strength, and then 26 parts of bromine added. After stirring for 24 hours at room temperature (about 20 to 30°) and working up as precedingly described, there is obtained a dyestuff which corresponds to the following composition:

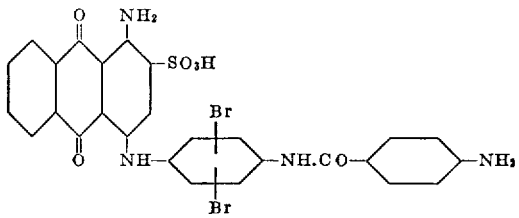

and which has properties similar to those of the dyestuff of Example 3.

*Example 5*

62.7 parts of the dyestuff of the formula

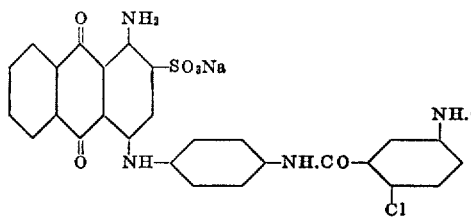

are dissolved in 1000 parts of sulfuric acid of 92% strength, and then 26 parts of bromine added. After stirring for about 24 hours and working up as precedingly described, there is obtained a dyestuff which corresponds to the following composition:

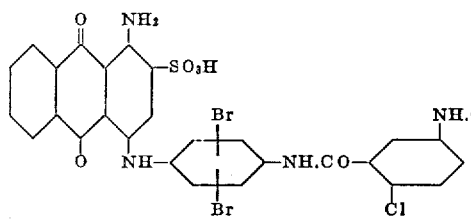

and which has properties similar to those of the dyestuffs obtained according to the preceding two examples.

*Example 6*

55.9 parts of the dyestuff of the formula

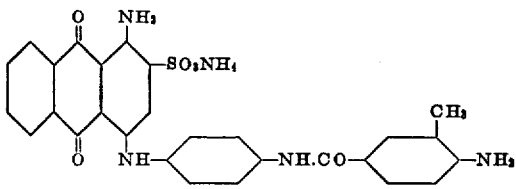

are dissolved in 1000 parts of sulfuric acid of 92% strength, and then 26 parts of bromine added. After stirring for about 24 hours and working up as precedingly described, there is obtained a dyestuff which corresponds to the following composition:

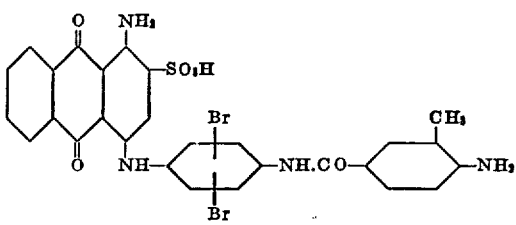

and which has properties similar to those of the dyestuffs of the preceding three examples, but which is somewhat more greenish.

*Example 7*

53.1 parts of the dyestuff of the formula

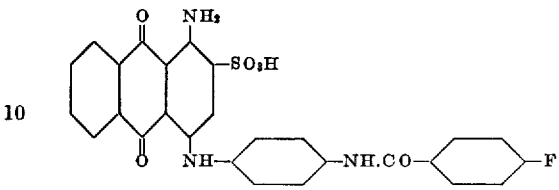

are dissolved in 1000 parts of sulfuric acid monohydrate at 10°, and then 24 parts of bromine added. The reaction mixture is stirred for 24 hours at 10° and the dyestuff then worked up as precedingly described. The thus-obtained dyestuff, which corresponds to the following composition:

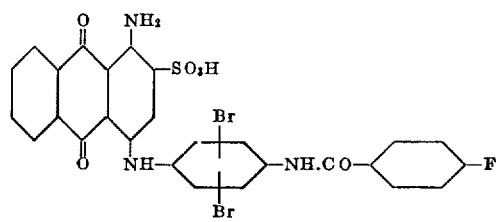

is a dark powder, which dissolves in water with a reddish blue coloration. The color of its solution in concentrated sulfuric acid is reddish blue which, upon addition of paraformaldehyde, undergoes a change toward green. The dyestuff dyes wool and other animal fibers, as well as nylon, in clear reddish blue shades of outstanding fastness to fulling and of good fastness to light, and it also has an excellent neutral drawing capacity.

*Example 8*

A dyestuff having properties similar to those of the dyestuff of Example 7 is obtained when following the procedure set forth in the latter example but replacing the 53.1 parts of the starting dyestuff there employed by 59.8 parts of the dyestuff of the formula

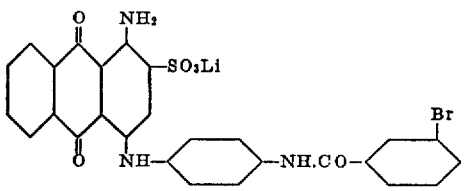

The product corresponds to the following composition:

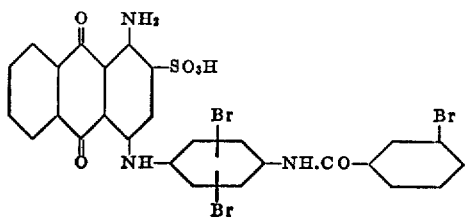

*Example 9*

10 parts of wool skein are introduced at 60° into a dyebath containing in solution in 800 parts of water, 0.1 part of the dyestuff according to Example 1, 1 part of Glauber's salt and 0.5 part of acetic acid of 30% strength. The bath is slowly brought to boiling and dyeing carried out therein

Example 10

10 parts of wool skein are introduced at 50° into a dyebath containing in solution in 800 parts of water, 0.15 part of the dyestuff according to Example 3, 1.5 parts of Glauber's salt and 0.5 part of ammonium acetate. Dyeing is carried out for ½ hour at 70° and then for ½ hour at the boil. The wool, after being rinsed and dried, is dyed in a reddish blue shade of outstanding fastness to fulling and of good fastness to light.

Similar good dyeings are obtained by using ammonium acetate in place of the Glauber's salt.

Example 11

A dyestuff having properties similar to those of the dyestuff of Example 7 is obtained when following the procedure set forth in the latter example but replacing the 53.1 parts of the starting dyestuff there employed by 58.2 parts of the dyestuff of the formula

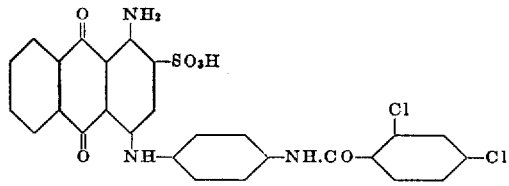

The product corresponds to the following composition

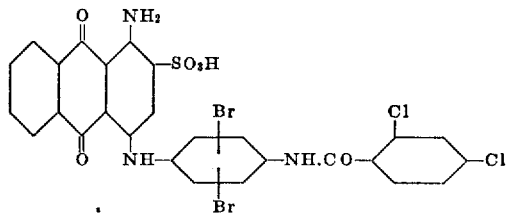

Having thus disclosed the invention, what is claimed is:

1. An acid dyestuff of the anthraquinone series which contains two atoms or bromine and which is obtained by treating in sulfuric acid medium with elementary bromine a 1-amino-4-aryl-aminoanthraquinone-2-sulfonic acid corresponding to the formula

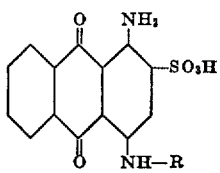

wherein R stands for a radical selected from the group consisting of

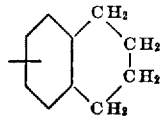

and

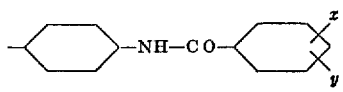

each of $x$ and $y$ representing a member selected from the group consisting of hydrogen, halogen, methyl, amino and acetylamino.

2. The acid dyestuff of the anthraquinone series which contains two atoms of bromine and which is obtained by treating 1-amino-4-(5',6',-7',8' - tetrahydronaphthyl - 1') - aminoanthraquinone-2-sulfonic acid in sulfuric acid medium with elementary bromine.

3. The acid dyestuff of the anthraquinone series which contains two atoms of bromine and which is obtained by treating 1-amino-4-(5',6',-7',8' - tetrahydronaphthyl-2') - aminoanthraquinone-2-sulfonic acid in sulfuric acid medium with elementary bromine.

4. The acid dyestuff of the anthraquinone series which contains two atoms of bromine and which is obtained by treating 1-amino-4-(4'-benzoylamino) - phenylaminoanthraquinone-2-sulfonic acid in sulfuric acid medium with elementary bromine.

5. The acid dyestuff of the anthraquinone series which contains two atoms of bromine and which is obtained by treating 1-amino-4-[4'-(4'' - amino) - benzoylamino] - phenylaminoanthraquinone-2-sulfonic acid in sulfuric acid medium with elementary bromine.

6. The acid dyestuff of the anthraquinone series which contains two atoms of bromine and which is obtained by treating 1-amino-[4'-(4''-fluoro) - benzoylamino] - phenylaminoanthraquinone-2-sulfonic acid in sulfuric acid medium with elementary bromine.

SAMUEL von ALLMEN.
HANS EGGENBERGER.

References Cited in the file of this patent
UNITED STATES PATENTS

| Number | Name | Date |
|---|---|---|
| 1,966,125 | Koeberle | July 10, 1934 |
| 2,066,707 | Weinand | Jan. 5, 1937 |
| 2,189,509 | Schlichenmeir | Feb. 6, 1940 |
| 2,236,672 | Coffey et al. | Apr. 1, 1941 |
| 2,541,623 | Allmen et al. | Feb. 13, 1951 |

Certificate of Correction

Patent No. 2,659,736                    November 17, 1953

Samuel von Allmen et al.

It is hereby certified that error appears in the printed specification of the above numbered patent requiring correction as follows:

Column 4, lines 49 to 53, Example 3, for that portion of the formula reading

column 7, line 48, for "atoms or" read *atoms of*;

and that the said Letters Patent should be read as corrected above, so that the same may conform to the record of the case in the Patent Office.

Signed and sealed this 12th day of January, A. D. 1954.

[SEAL]

ARTHUR W. CROCKER,
*Assistant Commissioner of Patents.*

Certificate of Correction

Patent No. 2,659,736  November 17, 1953

Samuel von Allmen et al.

It is hereby certified that error appears in the printed specification of the above numbered patent requiring correction as follows:

Column 4, lines 49 to 53, Example 3, for that portion of the formula reading

column 7, line 48, for "atoms or" read *atoms of*;

and that the said Letters Patent should be read as corrected above, so that the same may conform to the record of the case in the Patent Office.

Signed and sealed this 12th day of January, A. D. 1954.

[SEAL]

ARTHUR W. CROCKER,
*Assistant Commissioner of Patents.*